United States Patent
Carlson et al.

(10) Patent No.: US 7,822,072 B2
(45) Date of Patent: *Oct. 26, 2010

(54) CLOCK FILTER DISPERSION

(75) Inventors: Scott M. Carlson, Tucson, AZ (US); Michel Henri Théodore Hack, Cortlandt Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1376 days.

This patent is subject to a terminal disclaimer.

(21) Appl. No.: 11/223,878

(22) Filed: Sep. 9, 2005

(65) Prior Publication Data

US 2007/0086490 A1    Apr. 19, 2007

(51) Int. Cl.
H04J 3/06     (2006.01)
G06F 1/12     (2006.01)
G06F 1/04     (2006.01)

(52) U.S. Cl. ............... 370/516; 370/518; 370/519; 713/400; 713/503

(58) Field of Classification Search ......... 370/516–519; 713/400, 500, 503
See application file for complete search history.

(56) References Cited

U.S. PATENT DOCUMENTS

| | | | | |
|---|---|---|---|---|
| 6,157,957 | A * | 12/2000 | Berthaud | 709/248 |
| 6,661,810 | B1 * | 12/2003 | Skelly et al. | 370/516 |
| 6,957,357 | B2 * | 10/2005 | Liu et al. | 713/503 |
| 7,103,514 | B1 * | 9/2006 | Carlson et al. | 702/189 |
| 7,194,649 | B2 * | 3/2007 | Liu et al. | 713/400 |
| 2002/0120416 | A1 | 8/2002 | Liu et al. | |
| 2002/0176525 | A1 | 11/2002 | Yamaguchi et al. | |
| 2002/0188881 | A1 | 12/2002 | Liu et al. | |
| 2003/0031284 | A1 | 2/2003 | Ishida et al. | |
| 2003/0035444 | A1 | 2/2003 | Zwack | |
| 2005/0234927 | A1 | 10/2005 | Bande et al. | |
| 2007/0061607 | A1 * | 3/2007 | Carlson et al. | 713/503 |
| 2007/0086489 | A1 * | 4/2007 | Carlson et al. | 370/516 |

OTHER PUBLICATIONS

Moon et al., "Estimation and Removal of Clock Skew from Network Delay Measurements", Department of Computer Science, University of Massachusetts, 1999, pp. 1-8.*
Paxson, "On Calibrating Measurements of Packet Transit Times", Network Research Group, University of California, Berkeley, 1988, pp. 1-13.*
Paxson, Vern, "On Calibrating Measurements of Packet Transit Times", Network Research Group, University of California, Berkeley, 1988, pp. 11-21.*
Mills, D., "Internet Time Synchronization: The Network Time Protocol", IEEE Transactions on Communications, Oct. 1991, pp. 1485-1486.

* cited by examiner

*Primary Examiner*—Tri H Phan
(74) *Attorney, Agent, or Firm*—Scully, Scott, Murphy & Presser, P.C.; John E. Campbell

(57) ABSTRACT

Disclosed are a method and system to estimate the maximum error in the clock offset and skew estimation between two clocks in a computer system. The method comprises the steps of obtaining a first set of data values representing a forward delay between the first and second clocks, and obtaining a second set of data values representing a negative backward delay between the first and second clocks. The method comprises the further step of forming a lower convex hull for said first set of data values, and forming an upper convex hull for said second set of data values. First and second parallel lines are formed between the upper and lower convex hulls, and these parallel lines are used to estimate the worst case error for the offset, skew rate and dispersion of said first and second clocks.

15 Claims, 2 Drawing Sheets

Prior Art

CLOCK FILTER DISPERSION

CROSS REFERENCE TO RELATED APPLICATIONS

This application is related to copending application Ser. No. 11/223,876 for "Method And System For Clock Skew And Offset Estimation," filed Sept. 9, 2005; application Ser. No. 11/223,577 for "Use of T4 Timestamps To Calculate Clock Offset And Skew," filed Sept. 9, 2005; and application Ser. No. 11/223,730 for "Filter Turning Point Detection," filed Sept. 9, 2005, now U.S. Pat. No. 7,103,514, issued Sept. 5, 2006. The disclosures of the above-identified applications are herein incorporated by reference in their entireties.

BACKGROUND OF THE INVENTION

1. Field of the Invention

This invention generally relates to computer systems, and in particular to time synchronization in computer systems. Even more specifically, the invention relates to methods and systems for the estimation of clock offset and dispersion between two clocks, such as a local clock and its source clock, in a computer system.

2. Background Art

Modern computers use clocks for many purposes, including ensuring that many operations occur in the proper sequence or in synchronization. Because of this, it is important that the clocks themselves operate in close synchronization. Typically, two clocks are often not in perfect synchronization, and there are timing differences between the clocks. In addition, two clocks may not operate at the exact same frequency, so that the timing difference between the clocks changes over time. This change in the timing difference between the clocks is referred to as the clock skew.

Many computer-timing protocols require information such as the estimation of the skew and offset between two clocks. These two clocks may be, for example, a local clock and its source clock. The accuracy of these estimations is crucial for the synchronization of the protocol. For instance, a protocol may require that a calculated time of day (TOD) offset between two servers include an estimation of the accuracy of the calculation. This is referred to as the clock-offset dispersion and bounds the worst-case error for the calculation. While methods and systems to measure clock skew are known, these known procedures tend to be quite complex, unreliable in certain situations, or both.

SUMMARY OF THE INVENTION

An object of this invention is to provide an estimate of the worst-case error for the offset and skew rate between two clocks in a computer system.

Another object of the present invention is to provide an estimation of the clock offset and dispersion between a local clock and its clock source in a computer system.

These and other objectives are attained with a method and system to determine the maximum error in the clock offset and skew estimation between first and second clocks in a computer system. Also, the invention may be embodied in a program storage device readable by machine, tangibly embodying a program of instructions executable by the machine to perform method steps for estimating the maximum error in the clock offset and dispersion between first and second clocks in a computer system. The method comprises the steps of obtaining a first set of data values representing a forward delay between the first and second clocks, and obtaining a second set of data values representing a negative backward delay between the first and second clocks. The method comprises the further step of forming a lower convex hull for said first set of data values, and forming an upper convex hull for said second set of data values. First and second parallel lines are formed between the upper and lower convex hulls, and these parallel lines are used to estimate the worst case error for the offset, skew rate and dispersion of said first and second clocks. In a preferred embodiment, for example, the first and second lines are spun between the two convex hulls starting from a first end of said hulls. More specifically, the first and second lines are spun into extreme positions, and these extreme positions are used to estimate said worst-case error.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
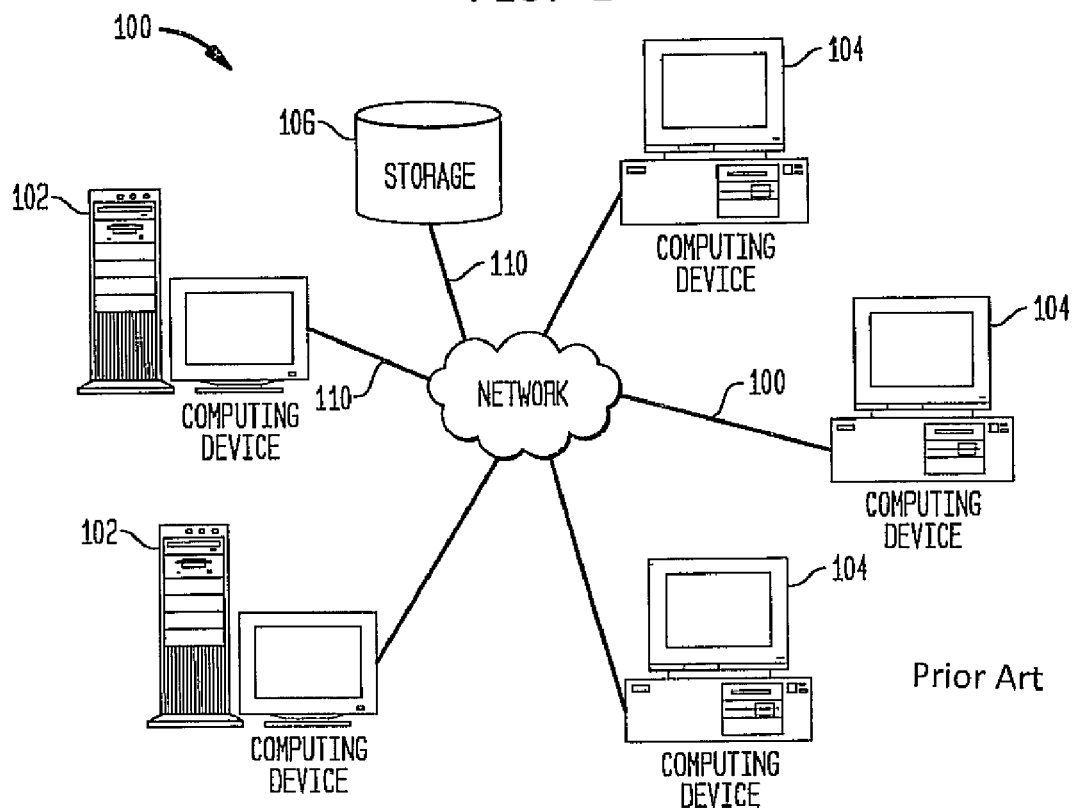
FIG. 1 illustrates a network of data processing systems in which the present invention may be implemented.

FIG. 1 illustrates a computer network 100, including servers 102, clients 104 and data storage unit 106. Network 100 also includes data connections 110 for transmitting data between the devices of the network. Network 100 may be, for example, the Internet, but could also be an intranet, a local are network a wide area network, point-to-point links, or other networks.

Any suitable servers 102 may be used in the network 100. Also, the clients 104 of network 100 may be, for example, personal computers, laptop computers, servers, workstations, main frame computers, or other devices capable of communicating over the network. Similarly, connectors 110 may comprise a wide range of suitable devices, such as wire, fiber optics or wireless communication links.

As mentioned above, various computer-timing protocols, including the Server Timing Protocol (STP), require information about the skew and offset between two clocks in computer systems or networks, such as network 100. The present invention is directed to determining the maximum error in the clock offset and skew estimation.

Figure 2:
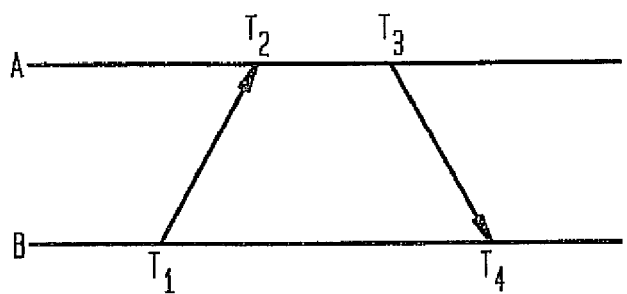
FIG. 2 illustrates a packet exchange between a clock machine B and a clock server A in the network of FIG. 1.

Reference is first made to FIG. 2, which illustrates a packet exchange between a local machine B and a clock server A. The packet leaves B at time T1, according to B's clock. The packet arrives at A at time T2, according to A's clock. Machine A then sends a reply packet at time T3, according to A's clock. The reply message reaches B at time T4, according to B's clock. By sending out this kind of exchange message regularly and recording the sequence of T1, T2, T3, T4 timestamps, one can obtain estimates of the relative offset and speed difference between the clock of machine B and the clock of machine A.

Procedures are known that compute a sequence of forward and backward delays (FD and BD) from the sequence of T1, T2, T3, T4 timestamps. For example, such procedures are described in U.S. patent application Ser. Nos. 09/920,138 and 10/157,610 and in U.S. Pat. No. 6,661,810. In particular, $$FD=T2-T1, BD=T4-T3.$$

Let's use T1(i), T2(i), T3(i), T4(i), FD(i) and BD(i) to denote the timestamps and delays for the $i^{th}$ packet exchange. Prior arts constructs two sets of delay points in the two dimensional plane, $\{(T1(i), FD(i))|i=1, \ldots \}$ and $\{(T1(i), BD(i))|i=1, \ldots \}$. U.S. Pat. No. 6,661,810 considers the two sets of points independently, which may not yield accurate results as the present invention. U.S. patent application Ser. Nos. 09/920,138 and 10/157,610 consider the two sets of delay points jointly, which yield better accuracy than U.S. Pat. No. 6,661,810.

Clock Dispersion Estimation

The present invention provides an approach to determine the maximum, or worst case, error in the clock offset and skew estimation. In known procedures, worst-case error estimates are often obtained through point estimates, i.e., by looking at individual points separately. An advantage of considering all the points in the filter at the same time is to obtain better estimates with smaller quantifiable error. See copending application Ser. No. 11/223,876).

Figure 3:
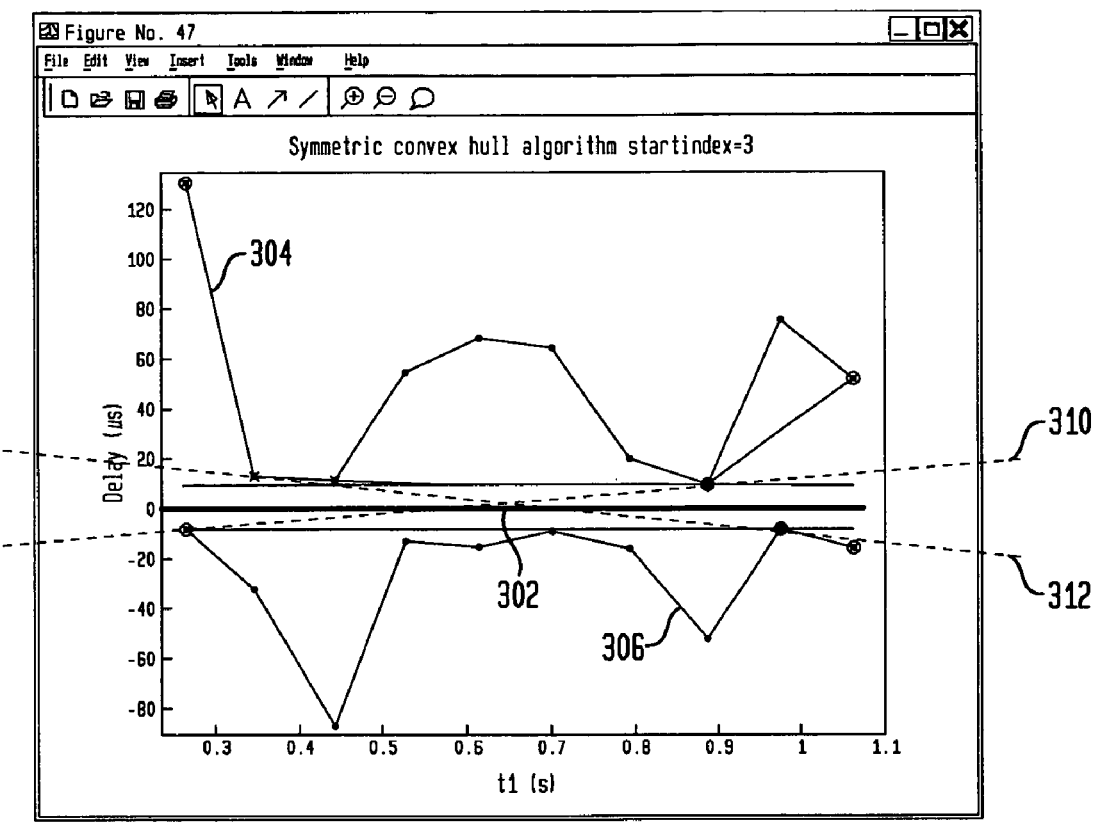
FIG. 3 shows a procedure for determining the maximum error in a clock offset and skew estimation.

Here it is preferably assumed there are no turning points in the trace. If there are turning points, then one can remove the segments by applying the turning point identification algorithm. (See copending application Ser. No. 11/223,730). When there are no turning points, then the clock runs as a straight line in between the convex hulls of the delay points. FIG. 3 is an example of the results of the symmetric convex hull algorithm. The line 302 in the middle is the best estimate of the relative clock line. The intercept and slope of this line provides the estimate of the relative offset and skew between the two clocks. The relative clock line can move freely between the top forward delay hull 304, and the bottom negative backward delay hull 306. The two extreme cases are shown as dashed lines 310 and 312. These two lines 310 and 312 provide the worst-case error estimates for the relative offset and skew between the two clocks. The preferred formal algorithm is given below Construct the lower convex hull for forward delay and the upper convex hull for the negative of backward delay.

Spin a pair of parallel lines, counter clockwise between the two convex hulls starting from the left end.

During the spin, the parallel lines are placed as far apart as possible. The two parallel lines touch the vertices of the two convex hulls.

In the spinning process, the touching vertex at the top (forward delay) hull moves from left to right. The touching vertex at the bottom (negative backward delay) hull moves from right to left.

The best parallel skew lines are obtained when the top touching vertex moves to the right of the bottom touching vertex.

The first extreme line is obtained at the first time the spinning line does not cut across any neighboring vertices for both of the convex hulls.

The second extreme line is obtained at the last time the spinning line does not cut across any neighboring vertices for both of the convex hulls.

Extend the two extreme lines to the current time, or any given time in the future. These extreme lines can be used to give the estimate of the worst-case error for the offset, skew rate and dispersion.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A computer implemented method of estimating the maximum error in the clock offset and dispersion between first and second clocks in a computer system, the method comprising the steps of:

obtaining at the computer a first set of data values representing a forward delay between the first and second clocks;

obtaining at the computer a second set of data values representing a negative backward delay between the first and second clocks;

generating lower convex hull data values on the computer comprising values of a lower convex hull for said first set of data values;

generating upper convex hull data values on the computer comprising values of an upper convex hull for said second set of data values;

generating parallel line data values on the computer comprising values of first and second parallel lines between the upper and lower convex hulls; and using the parallel line data values on the computer to estimate the worst-case error for the offset, skew rate and dispersion of said first and second clocks; and wherein the using step includes the step of generating spinning line data values on the computer comprising values of spinning the first and second lines between the two convex hulls starting from a first end of said hulls.

2. A method according to claim 1, wherein:

the step of generating spinning line data values includes the steps of i) generating first line extreme position data values on the computer comprising values of spinning said first line into an extreme position for the first line, and ii) generating second line extreme data values on the computer comprising values of spinning said second line into an extreme position for the second line;

and the using step includes the further step of using said first line extreme position data values and said second line extreme position data values to estimate said worst-case error.

3. A method according to claim 2, wherein the step of using said first line extreme position data values and said second line extreme position data values includes the step of generating extended line data values comprising values for extending said first and second lines, when in the extreme positions, to a specified time.

4. A method according to claim 3, wherein said specified time is the current time.

5. A method according to claim 2, wherein:
the values of spinning the first line into the extreme position of the first line are values of spinning the first line into a position obtained at the first time the spinning first line does not cut across any neighboring vertices for both of the convex hulls; and
the values of spinning the second line into the extreme position of the second line are values of spinning the second line into a position obtained at the last time the spinning second line does not cut across any neighboring vertices for both of the convex hulls.

6. An estimating system for estimating the maximum error in the clock offset and dispersion between first and second clocks in a computer system, the estimating system comprising:
a computer system for performing a the steps comprising:
generating lower convex hull data values on the computer comprising values of a lower convex hull for a first set of data values representing a forward delay between the first and second clocks;
generating upper convex hull data values on the computer comprising values of an upper convex hull for a second set of data values representing a negative backwards delay between the first and second clocks;
generating parallel line data values on the computer comprising values of first and second parallel lines between the upper and lower convex hulls; and
using the parallel line data values on the computer to estimate the worst-case error for the offset, skew rate and dispersion of said first and second clocks; and
wherein the using includes generating spinning line data values on the computer comprising values of spinning the first and second lines between the two convex hulls starting from a first end of said hulls.

7. An estimating system according to claim 6, wherein:
the step of generating spinning line data values includes generating first line extreme position data values on the computer comprising values of spinning said first line into an extreme position for the first line, and generating second line extreme position data values on the computer comprising values of spinning said second line into an extreme position for the second line; and
the using further includes using said first line extreme position data values and said second line extreme position data values to estimate said worst-case error.

8. An estimating system according to claim 7, wherein the using said first line extreme position data values and said second line extreme position data values includes generating extended line data values comprising values for extending said first and second lines, when in the extreme positions, to a specified time.

9. An estimating system according to claim 8, wherein said specified time is the current time.

10. An estimating system according to claim 7, wherein:
the values of spinning the first line into the extreme position of the first line are values of spinning the first line into a position obtained at the first time the spinning first line does not cut across any neighboring vertices for both of the convex hulls; and
the values of spinning the second line into the extreme position of the second line are values of spinning the second line into a position obtained at the last time the spinning second line does not cut across any neighboring vertices for both of the convex hulls.

11. A computer program product comprising:
a tangible computer readable storage device storing a tangible program of instructions, executable by a computer, for estimating the maximum error in the clock offset and dispersion between first and second clocks in a computer system, said program of instructions, when executed in the computer, performing the following steps:
obtaining at the computer a first set of data values representing a forward delay between the first and second clocks;
obtaining at the computer a second set of data values representing a negative backward delay between the first and second clocks;
generating lower convex hull data values on the computer comprising values of a lower convex hull for said first set of data values;
generating upper convex hull data values on the computer comprising values of an upper convex hull for said second set of data values;
generating parallel line data values on the computer comprising values of first and second parallel lines between the upper and lower convex hulls; and
using the parallel line data values on the computer to estimate the worst-case error for the offset, skew rate and dispersion of said first and second clocks; and
wherein the using step includes the step of generating spinning line data values on the computer comprising values of spinning the first and second lines between the two convex hulls starting from a first end of said hulls.

12. The computer program product according to claim 11, wherein:
the step of generating spinning line data values includes the steps of
i) generating first line extreme position data values on the computer comprising values of spinning said first line into an extreme position for the first line, and
ii) generating second line extreme data values on the computer comprising values of spinning said second line into an extreme position for the second line;
and the using step includes the further step of using said first line extreme position data values and said second line extreme position data values to estimate said worst-case error.

13. The computer program product according to claim 12, wherein the step of using said first line extreme position data values and said second line extreme position data values includes the step of generating extended line data values comprising values for extending said first and second lines, when in the extreme positions, to a specified time.

14. The computer program product according to claim 13, wherein said specified time is the current time.

15. The computer program product storage device according to claim 12, wherein:
the values of spinning the first line into the extreme position of the first line are values of spinning the first line into a position obtained at the first time the spinning first line does not cut across any neighboring vertices for both of the convex hulls; and the values of spinning the second line into the extreme position of the second line are values of spinning the second line into a position obtained at the last time the spinning second line does not cut across any neighboring vertices for both of the convex hulls.

* * * * *